April 20, 1965  J. E. McNAMARA  3,179,800
APPARATUS FOR MEASURING THICKNESS VARIATION
ACROSS THE WIDTH OF A MOVING STRIP
Filed Oct. 28, 1960
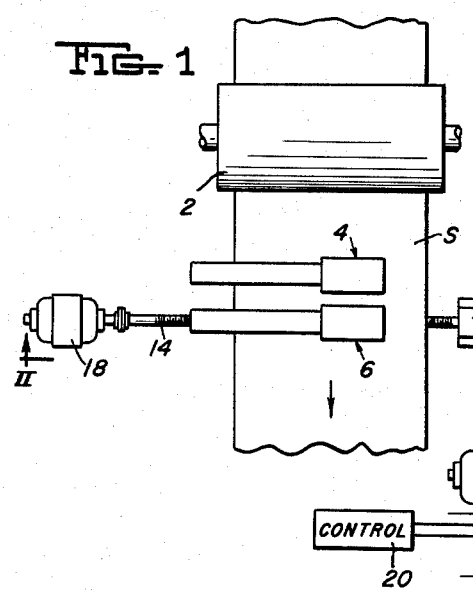
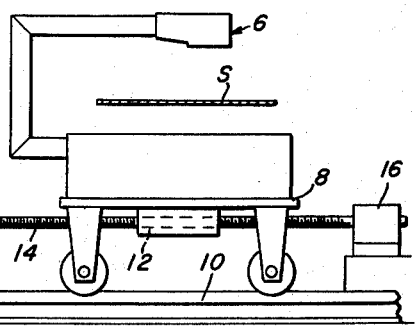
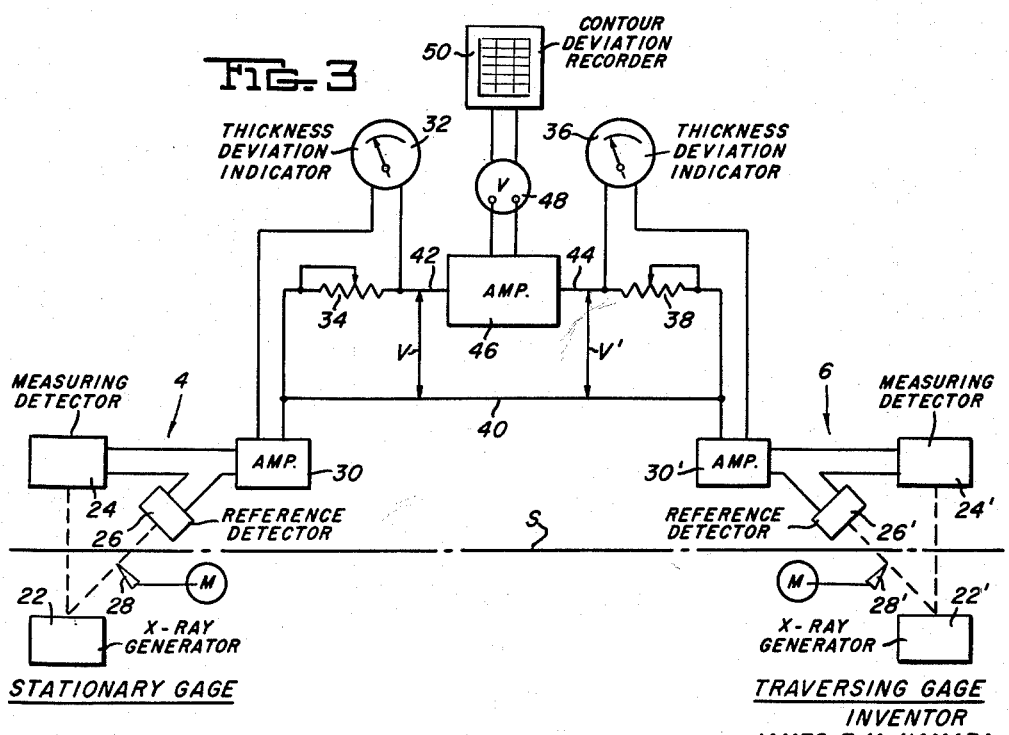
INVENTOR
JAMES E. McNAMARA
By Donald G. Dalton
Attorney

United States Patent Office 3,179,800
Patented Apr. 20, 1965

3,179,800
APPARATUS FOR MEASURING THICKNESS VARIATION ACROSS THE WIDTH OF A MOVING STRIP
James E. McNamara, Pittsburgh, Pa., assignor to United States Steel Corporation, a corporation of New Jersey
Filed Oct. 28, 1960, Ser. No. 65,800
4 Claims. (Cl. 250—52)

This invention relates to apparatus for measuring thickness variation across the width of a moving strip, particularly steel strip. Such strip, particularly strip in a hot mill, varies in thickness along its length and also transversely across its width. Gauges, both contact and non-contact types, have been developed for measuring thickness and/or deviations from a desired thickness in a moving strip. To the best of my knowledge no successful means of measuring deviations in thickness across the width of a moving strip has been developed. Gauges have been developed for measuring the thicknesses or deviations from thickness across the width of the strip, but these are not accurate because during the time required to traverse the strip there may be substantial changes in measured thickness caused by movement of the strip longitudinally. For example, deviations in finished thickness across the width of a hot rolled strip may be as great as .001" per inch of width, particularly near the edges of the strip. Even if a contour gauge were used and if sensing 63% of the actual deviation would be acceptable the maximum traversing speed could be only 1" per .05 second so that in a 36" wide strip 1.8 seconds would be necessary to traverse. Thickness variations along the length of the strip occur as much as .002" per second for a strip traveling at normal mill speeds. Thus, in the 1.8 seconds required for the gauge to traverse the strip there will be a change of .0036" in thickness of strip passing the transverse gauge. Therefore, since the longitudinal deviation in thickness for a given period of time is almost four times the magnitude of the traverse deviation in the same period of time the readings obtained by the traversing gauge would have no value. Extensive tests on hot rolled and cold rolled strip indicate that all points measured across 95% of the width of the strip vary in thickness simultaneously and by approximately the same amount. In other words, while the thickness of the strip varies longitudinally the transverse contour of the strip at various points along the length of the strip will be the same except for a constant deviation across the width due to changes along the length of the strip.

It is therefore an object of my invention to provide apparatus for measuring thickness variation across the width of a moving strip which compensates for changes in thickness longitudinally of the strip.

This and other objects will be more apparent after referring to the following specification and attached drawings, in which:

FIGURE 1 is a schematic plan view of the apparatus of my invention;

FIGURE 2 is a view taken on the line II—II of FIGURE 1; and

FIGURE 3 is a schematic electrical diagram of the apparatus.

Referring more particularly to the drawings reference numeral 2 indicates a work roll in a hot roll stand, particularly the last stand of the mill. A stationary gauge 4 is mounted on the exit side of the roll 2 for measuring deviation in thickness of the strip S as it moves longitudinally through the gauge. A traversing gauge 6 is mounted adjacent the gauge 4 and is supported on a carriage 8 mounted for movement on track 10. The carriage 8 is provided with female threads 12 for receiving the male threads of a screw 14 having one end supported in bearing 16 and the other end supported by the shaft of a motor 18. A motor control 20 is provided to cause the carriage to move transversely of the strip S at a predetermined rate and pattern. It will be understood that other means may be provided for traversing the gauge 6 since many mechanisms are known for this purpose. The gauges 4 and 6 may be of any standard type. For example, as shown in FIGURE 3, they may be a General Electric "Raymike 600" X-ray thickness gauge. The gauge 4, as shown, includes an X-ray generator 22, a measuring detector 24, a reference detector 26, a motor driven wedge 28 arranged between the X-ray generator 22 and the reference detector 26, and a deviation amplifier 30. Similar parts making up the X-ray gauge 6 are indicated by priming the corresponding reference numerals. The output of amplifier 30 is connected to a thickness deviation indicator 32 through a resistor 34. In like manner the output of amplifier 30' is connected to a thickness deviation indicator 36 through a resistor 38. A lead 40 is connected across one side of resistors 34 and 38 and the other side of the resistors are connected by leads 42 and 44 to a standard high impedance amplifier 46, the output of which is connected to a contour deviation indicator or volt meter 48 and to a contour deviation recorder 50.

In operation, the strip S passes between the gauges 4 and 6 with the wedges 28 and 28' being adjusted to indicate the standard thickness or the thickness which is being aimed at by the mill. Resistors 34 and 38 may also be used to calibrate the system. As the strip passes between the gauge 4 the measuring detector 24 will produce an output impulse in milliamperes proportional to actual strip thickness and detector 26 will have a similar output impulse proportional to desired strip thickness. The amplifier 30 algebraically subtracts the impulse from detector 26 from that of detector 24 and impresses it on the thickness deviation indicator 32 which is calibrated to indicate thickness changes in thousandths of an inch. At the same time gauge 6 will operate in the same manner with the thickness deviation being indicated on indicator 36. Voltage V appearing across resistor 34 will be proportional to the difference between desired strip thickness and actual strip thickness as measured by stationary gauge 4 and voltage V' appearing across resistor 38 will be proportional to the difference between desired strip thickness and actual strip thickness as measured by gauge 6. Assuming that this first measurement by gauge 6 is in the same longitudinal plane as the gauge 4 the voltages V and V' will be equal since the two gauges are closely adjacent to one another and there will be a zero reading on indicator 48 and recorder 50. The gauge 6 then moves to a second position where the operation is repeated. If the two thickness measurements at the second position are not the same thereby will be a difference between the voltages V and V' which will be amplified by amplifier 46 and impressed upon the contour deviation indicator 48 and recorder 50. This operation is then repeated across the width of the strip so that a contour is obtained on recorder 50 which is a true indication of variation of strip thickness across the width of the strip.

While one embodiment of my invention has been shown and described, it will be apparent that other adaptations and modifications may be made without departing from the scope of the following claims.

I claim:

1. Apparatus for measuring thickness variation across the width of a moving opaque strip of substantially constant density comprising a stationary thickness gage for measuring strip thickness in one longitudinal plane of the strip, a movable thickness gage, means for moving said last named gage transversely of said strip across the majority of the width thereof as the strip moves therepast, and means for comparing the outputs of said gages at more than one transverse position on the strip.

2. Apparatus for measuring thickness variation across the width of a moving opaque strip of substantially constant density comprising a stationary thickness gage for for measuring deviations in thickness from a preset normay thickness in one longitudinal plane of the strip, a movable thickness gage for measuring deviations in thickness from a preset normal thickness, means for moving said last named gage transversely of said strip across the majority of the width thereof as the strip moves therepast, and means for algebraically adding the outputs of said gages at more than one transverse position on the strip.

3. Apparatus for measuring thickness variation across the width of a moving opaque strip of substantially constant density comprising stationary means for obtaining signals proportional to strip thickness in one longitudinal plane of the strip, means providing a signal proportional to a predetermined strip thickness, means for algebraically subtracting said last named signal from said first named signal, movable means for obtaining signals proportional to strip thickness, means for moving said last named means transversely of said strip across the majority of the width thereof as the strip moves therepast, means providing a signal proportional to a predetermined strip thickness, means for algebraically subtracting said last named signal from said signal from said movable means, and means for algebraically adding the outputs of said subtracting means at more than one transverse position on the strip.

4. Apparatus for measuring thickness variation across the width of a moving opaque strip of substantially constant density comprising the steps of measuring the thickness of the strip in one longitudinal plane as a reference thickness, measuring the thickness successively at a plurality of longitudinal planes across the majority of the width of the strip with each successive measurement being simultaneous with a reference thickness measurement, and comparing said simultaneously measured thicknesses.

References Cited by the Examiner
UNITED STATES PATENTS

| | | | |
|---|---|---|---|
| 2,525,292 | 10/50 | Fua et al. | 250—83.4 |
| 2,675,483 | 4/54 | Leighton et al. | 250—83.4 |
| 2,889,463 | 6/59 | Linsert et al. | 250—83.4 |
| 2,896,084 | 7/59 | MacDonald | 250—43.5 |
| 2,909,660 | 10/59 | Alexander | 250—83.4 |
| 2,913,900 | 11/59 | Andrews | 250—43.5 |
| 2,920,206 | 1/60 | Heller | 250—83.4 |
| 2,920,207 | 1/60 | Powell | 250—83.4 |
| 2,937,280 | 5/60 | Gilman | 250—83.4 |
| 2,961,548 | 11/60 | Prell | 250—219 |
| 2,975,293 | 3/61 | Kruse et al. | 250—219 |

RALPH G. NILSON, *Primary Examiner.*

ARTHUR GAUSS, WALTER STOLWEIN, *Examiners.*